US005781393A

United States Patent [19]

Tabib-Azar et al.

[11] Patent Number: 5,781,393

[45] Date of Patent: Jul. 14, 1998

[54] SURGE ARRESTER

[75] Inventors: Masood Tabib-Azar, Cleveland Heights; John C. Glass, Twinsburg; Mark R. DeGuire, Cleveland Heights; Kenneth A. Golonka, Richmond Heights, all of Ohio

[73] Assignee: Erico International Corporation, Solon, Ohio

[21] Appl. No.: 633,204

[22] Filed: Apr. 16, 1996

[51] Int. Cl.[6] ........ H02H 1/00

[52] U.S. Cl. ........ 361/118; 361/128

[58] Field of Search ........ 361/56, 111, 117–130; 338/13, 20, 21, 22 R, 22 SD

[56] References Cited

U.S. PATENT DOCUMENTS

| | | | |
|---|---|---|---|
| 1,818,184 | 8/1931 | Work et al. | 252/509 |
| 2,297,323 | 9/1942 | Rees et al. | 313/268 |
| 2,309,183 | 1/1943 | Gilson et al. | 338/315 |
| 2,415,945 | 2/1947 | Gilson | 174/52.1 |
| 2,473,850 | 6/1949 | Beck et al. | 361/127 |
| 2,650,330 | 8/1953 | Stoelting | 361/126 |
| 2,719,934 | 10/1955 | Sands | 313/243 |
| 2,859,318 | 11/1958 | Ohlheiser | 338/35 |
| 2,907,910 | 10/1959 | Marsteller | 313/231.11 |
| 2,923,849 | 2/1960 | Rees | 313/311 |
| 3,204,322 | 9/1965 | Rees | 445/6 |
| 3,968,393 | 7/1976 | Murano et al. | 313/325 |
| 4,237,515 | 12/1980 | Pierce, Jr. | 361/127 |
| 4,237,516 | 12/1980 | Pierce, Jr. | 361/127 |
| 4,400,754 | 8/1983 | Schweickardt | 361/38 |
| 4,642,733 | 2/1987 | Schacht | 361/656 |
| 4,733,324 | 3/1988 | George | 361/118 |
| 4,851,956 | 7/1989 | Borkowicz et al. | 361/118 |
| 5,222,010 | 6/1993 | Capan | 361/56 |
| 5,436,787 | 7/1995 | Ballinger | 361/128 |

OTHER PUBLICATIONS

Ronald R. Capan, "Electronic Signaling Equipment: Issues for Survival," Aug. 1989.

Union Switch and Signal, "Style USG Lightning Arresters," Jan. 1959.

Advertising Sheet, Harmon Industries, Inc., "Three Terminal Arrester," 1995.

Advertising Sheets, Safetran, "Air Gap Arresters", Jan. 1992.

Advertising Sheets, Safetran, "Equalizers", Oct. 1981.

Advertising Sheet, Safetran, "AC Power Line Protector", Oct. 1981.

Safetran Systems Corporation, "Surge Protection for Solid State Signal Systems," Apr. 5, 1993.

American Standard Inc., "Union Switch & Signal Division, Lightning and Railroad Lightning Signaling," Bulletin 340, Apr. 1979 (?).

Advertising Sheets, American Standard Inc., Union Switch & Signal Division, "USG–A E–Z Vue Attesters,", Jun. 1986.

*Primary Examiner*—Jeffrey A. Gaffin
*Assistant Examiner*—Michael J. Sherry
*Attorney, Agent, or Firm*—Renner, Otto, Boisselle, Sklar

[57] ABSTRACT

A surge arrester which includes a pair of spaced metal electrodes and a semiconductor element interposed between the metal electrodes and in contact with at least one of the metal electrodes. The semiconductor element functions at least partially to bridge a gap between the metal electrodes with such gap serving as a current path between the metal electrodes in the event a voltage applied across the metal electrodes exceeds a firing voltage of the surge arrester. The semiconductor element includes a metal coating on at least a substantial portion of its outer surface which is in contact with the at least one metal electrode. The coating includes a gap between the electrodes and the gap may include a notch in the gap.

30 Claims, 3 Drawing Sheets

SURGE ARRESTER

TECHNICAL FIELD

The present invention relates generally to a surge arrester and to electric over-voltage and surge protection. More specifically, the present invention relates to surge arresters for providing voltage surge protection of electrical circuits such as those used in railroad and other applications.

BACKGROUND OF THE INVENTION

Surge arresters are widely used to protect electrical circuitry from the harmful effects of transient high-voltage signals, sometimes called "spikes". These high-voltage signals can arise from a variety of sources, including lightning strikes to the power lines, the switching on or off of inductive components in the circuit, the discharging of capacitive components in the circuit, and other causes.

Surge arresters are normally connected in parallel with the circuitry they are intended to protect. The current-voltage (I–V) characteristics of a typical surge arrester are highly non-linear. Under normal operating conditions involving relatively low voltages across the circuit being protected, the surge arrester exhibits high impedance and consequently draws little current. On the other hand at high voltages, such as those presented in the event of a voltage spike or surge across the circuit being protected, the impedance of the surge arrester decreases dramatically. Under such conditions, the surge arrester draws an appreciable current. This current in turn promotes ionization of the air ("sparking") across a gap included in the surge arrester. This sparking provides further dissipation of the current and high voltage through the arrester, thereby protecting the circuit. This entire process, by which the high-voltage transient is shunted through the arrester, is called "firing".

Problems with existing commercial surge arresters of this type primarily involve service life and poor repeatability of the firing voltage over such service life. For example, one firing event might be triggered by a low voltage spike across the arrester, but the next or subsequent firings might not occur until the voltage across the arrester reaches two times the voltage. Thus, the actual range of voltages over which firing may or may not occur is relatively broad, and the range usually widens with time. This is a problem because, in the years since the currently available surge arresters were developed, the types of electrical circuits that these devices are intended to protect have become increasingly sensitive to fluctuations in the line voltage conditions that they experience during service.

In view of the aforementioned shortcomings associated with conventional surge arresters, there is a strong need in the art for a surge arrester which exhibits a narrow range of firing voltages. In particular, there is a strong need for a surge arrester which reliably and repeatedly fires within a narrow firing range and exhibits an I–V curve with a relatively sharp knee over a long service life.

SUMMARY OF THE INVENTION

According to one aspect of the invention, a surge arrester is provided which includes a pair of spaced metal electrodes and a semiconductor element interposed between the metal electrodes and in contact with at least one of the metal electrodes. The semiconductor element functions at least to partially bridge a gap between the metal electrodes with such gap serving as a current path between the metal electrodes in the event a voltage applied across the metal electrodes exceeds a firing voltage of the surge arrester. Moreover, the semiconductor element includes a metal coating on at least a substantial portion of its outer surface which is in contact with the at least one metal electrode.

According to another aspect of the invention, a surge arrester is provided which includes a pair of spaced circular metal electrodes and a semiconductor disk in contact with and interposed between the metal electrodes. The semiconductor disk functions to bridge a gap between the metal electrodes with such gap serving as a current path between the metal electrodes in the event a voltage applied across the metal electrodes exceeds a firing voltage of the surge arrester. The semiconductor disk includes a metal coating on at least a substantial portion of its outer surface which is in contact with at least one of the metal electrodes.

According to yet another aspect of the invention, a surge arrester is provided which includes a pair of spaced circular metal electrodes and a semiconductor disk interposed between the metal electrodes with the semiconductor disk in contact with one of the metal electrodes and electrically isolated from the other metal electrode. The semiconductor disk functions partially to bridge a gap between the metal electrodes with such gap serving as a current path between the metal electrodes in the event a voltage applied across the metal electrodes exceeds a firing voltage of the surge arrester. In addition, the semiconductor disk includes a metal coating on at least a substantial portion of its outer surface which is in contact with the one metal electrode.

In accordance with yet another aspect of the invention, a method of making a surge arrester is provided. The method includes the steps of fitting two electrodes on opposite sides of a semiconductor disk, and providing a conductive metal coating between at least one of the electrodes and the semiconductor disk.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DESCRIPTION OF THE PREFERRED EMBODIMENT

Figure 1:
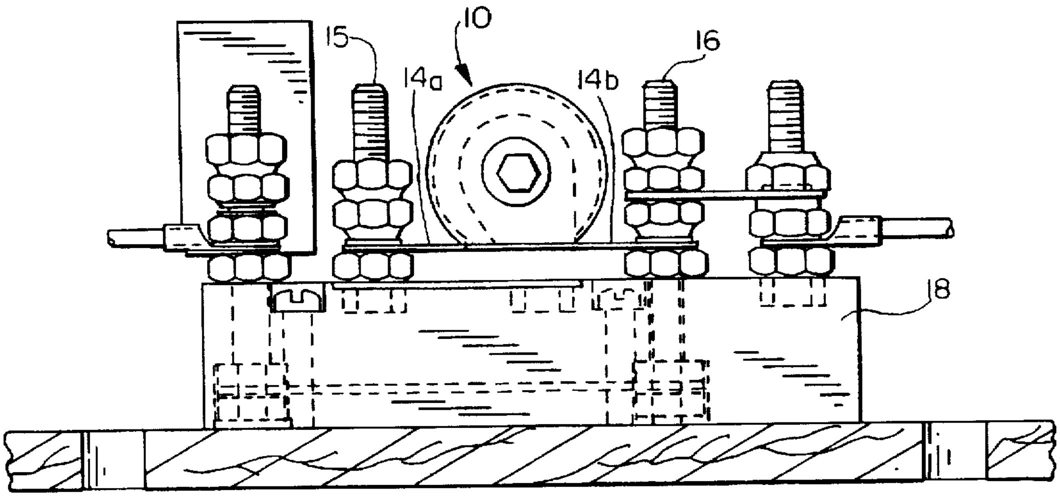
FIG. 1 is a side elevation view of a surge arrester in accordance with the present invention connected to terminal posts of a terminal block.

Referring initially to FIG. 1, there is shown generally at 10 a surge arrester in accordance with the present invention. The surge arrester 10 includes a pair of lateral conductive support brackets 14*a* and 14*b* supporting respective electrodes described below and secured to and electrically connected to terminals 15 and 16 of a terminal block 18. Typically, the terminals 15 and 16 are connected across a device to be protected (not shown) and/or are connected between a line voltage and ground. Ordinarily, the resistance presented by the surge arrester 10 across the terminals 15 and 16 is relatively large. However, in the event a large voltage appears across the terminals 15 and 16 due to a lightning strike, for example, the surge arrester 10 will fire and the resistance across the terminals 15 and 16 drops dramatically. An exemplary embodiment of the terminal block 18 is described in U.S. Pat. No. 5,023,745 to Glass.

Figure 2:
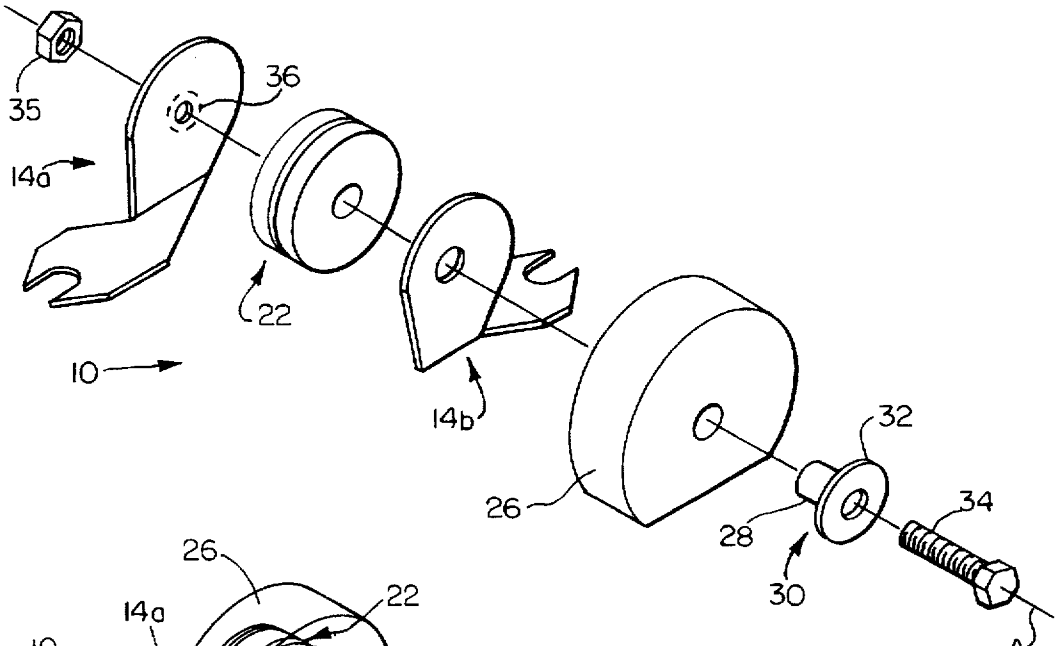
FIG. 2 is an exploded view of a surge arrester in accordance with the present invention.
Figure 3:
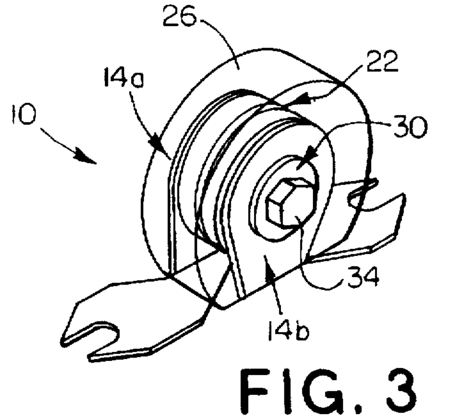
FIG. 3 is an isometric view of the components of FIG. 2 assembled in accordance with the present invention.

Turning now to FIGS. 2 and 3, the surge arrester 10 is illustrated in more detail. The surge arrester 10 includes an electrode assembly 22 as described in detail below interposed between support brackets 14*a* and 14*b*. A cover 26 substantially surrounds the periphery and one side of the electrode assembly 22. The electrode assembly 22, support bracket 14*b* and cover 26 each include a bore along assembly axis A designed to receive the neck portion 28 of a shoulder insulator 30. The cover 26, support bracket 14*b* and electrode assembly 22 are assembled onto the shoulder insulator 30 against enlarged end flange 32. The support bracket 14*a* is aligned with the shoulder insulator 30 on the opposite side. The thus formed assembly may be held together by a threaded fastener 34 passing through the shoulder insulator 30 and a bore in the support bracket 14*a* and fixed by a nut 35 bearing against flange 32. In another embodiment, the nut 35 can be replaced by a rolled thread in an extruded section of the support bracket 14*a* as represented by dashed line 36.

The support brackets 14*a* and 14*b* are made of electrically conductive metal such as nickel plated brass alloy which provides suitable mechanical strength. The electrically conductive support brackets 14*a* and 14*b* are in direct physical and electrical contact with respective metal electrodes in the electrode assembly 22, and hence the voltage appearing across the support brackets 14*a* and 14*b* in the terminal block 18 is applied across the electrode assembly 22. The cover 26 is made of any suitable material capable of protecting against damage to surrounding circuitry due to arcing which may occur in the electrode assembly 22 when the surge arrester 10 fires. For example, the cover 26 may be made of self-extinguishing plastic. The shoulder insulator 30 is made of non-conductive heat resistant material such as nylon.

The present invention relates primarily to the design of the electrode assembly 22 which provides steeper I–V characteristics compared to conventional surge arresters and improved repeatability in firing. The electrode assembly in a conventional surge arrester consists of a disk shaped semiconductor element sandwiched between a pair of metal electrodes, as seen for example in U.S. Pat. No. 3,204,322 to Rees. The dimensions of the semiconductor element and the metal electrodes are selected such that the rims of the metal electrodes are separated by a uniform air gap. Electrically, the air gap constitutes a capacitor in parallel with the metal-semiconductor-metal series components.

The present invention differs in part from conventional surge arresters in that a uniform metal coating is applied to the outer surface of the semiconductor element. The metal coating may be applied by a number of techniques, such as brush/spray application or screen printing and subsequent firing of metallic inks, or by vapor deposition of a metal film. The metal coating results in a more uniform electric field distribution at the surface of the semiconductor element in contact with the metal electrodes. Without the coating, the electric field is concentrated at surface projections such as sharp protrusions of the angular silicon carbide grains. These irregularities are an inevitable consequence of the granular or rough nature of the semiconductor element microstructure. With such localized regions of high electric field, the firing behavior of the arrester will be dictated by the characteristics of the microstructure (grain size, porosity, and relative amounts of the silicon carbide to the binder phase) in the vicinity of the irregularities, which may not be representative of the semiconductor element microstructure as a whole.

With a metal coating on the semiconductor element, in contrast, the electric field will be more uniformly distributed across the faces of the element within the electrode assembly. The firing characteristics are more uniform from firing event to firing event over the service life of the arrester, since they are dictated by the microstructure of the semiconductor element as a whole.

Figure 4:
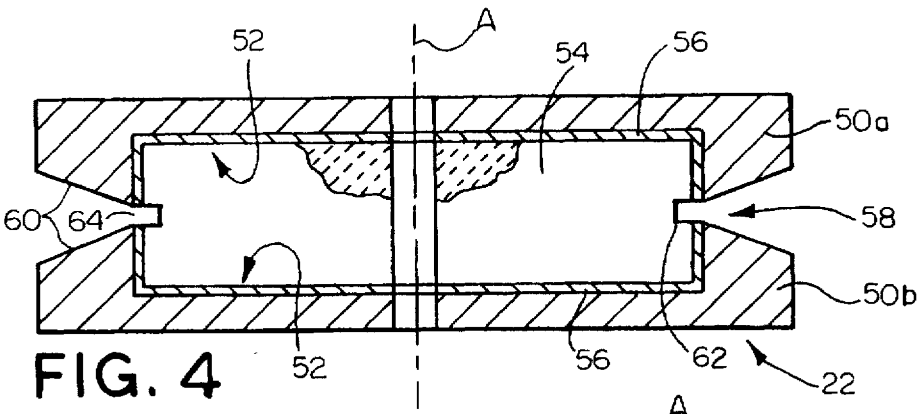
FIG. 4 is an enlarged diametral section of one line-to-line embodiment of the surge arrester electrode assembly of the present invention.

FIGS. 4–7 illustrate five exemplary embodiments of the electrode assembly 22 in accordance with the present invention. FIG. 4 shows a first example of the electrode assembly 22 connected in a line-to-line configuration. The electrode assembly 22 includes disk-shaped metal electrodes 50*a* and 50*b* each including cylindrical cavities 52 for receiving a disk-shaped semiconductor element 54 interposed between the electrodes. The semiconductor element 54 has an appropriate outside diameter to provide a press fit assembly within the cavities 52. The press fit provides good electrical contact between the metal electrodes and the semiconductor element 54.

The semiconductor element 54 preferably is made of silicon carbide base ceramic of the type conventionally used in surge arresters. The metal electrodes 50*a* and 50*b* are made, for example, from nickel plated copper alloy such as brass. As discussed above, the semiconductor element 54 further includes a metal coating 56 on its outer surface. The coating 56 preferably is made of an electrically conductive metal such as silver, chromium, platinum, palladium, copper, nickel, or a combination or alloys thereof. In the exemplary embodiment, the metal coating 56 consists of a conductive paint impregnated with silver. The paint is brushed evenly onto the surface of the semiconductor element 54, and dries to an adherent, electrically conductive thin layer thereon at room temperature. Alternatively, the metal coating 56 may be applied by screen printing of a fireable metallic ink or by application of a metallorganic precursor that will form a metallic layer upon firing. Such a process will provide a metal coating with a more uniform thickness and good adherence. Other methods such as dipping the semiconductor element 54 in a metal coating bath may also be employed. The surface of the metal coating may be smoothed after application.

The thickness of the metal coating 56 preferably is thick enough to eliminate any irregularities in the surface of the semiconductor element 54 and provide a smooth conductive surface which contacts the walls of the cylindrical cavities 52 in each of the metal electrodes 50*a* and 50*b*. The thickness of the metal coating may range from about 0.05 microns to about 500 microns. A preferred range is from about 0.2 to 25 microns.

The thickness of the semiconductor element 54 and the depths of the cavities 52 may vary as well as the dimensions of the gap 58 formed between the rims 60 of the metal electrodes. The dimensions of the gap 58 determine in part the firing voltage of the surge arrester 10. The gap 58 between the metal electrodes in this embodiment is bridged by the semiconductor element 54. The inwardly tapered rim 60 of each of the metal electrodes in the area of the gap 58 serves to draw out radially a spark which occurs across the gap 58 when the voltage across the electrodes 50*a* and 50*b* exceeds a predetermined voltage and the surge arrester fires. Thus, the spark is drawn away from the surface of the semiconductor element 54 and is dissipated in the surrounding air.

Under normal operating conditions when the surge arrester 10 is not firing, it is desirable to prevent current from being short circuited between the electrodes 50*a* and 50*b* by the metal coating 56. As a result, a groove 62 is formed around the circumference of the semiconductor material 54 in the region of the gap 58. The groove 62 does not include the metal coating 56 and creates a small annular uniform gap 64 in the metallic coating. Thus, although the entirety of the outer surfaces of the semiconductor element 54 which contact the respective metal electrodes 50*a* and 50*b* are covered by the metal coating 56, there is no direct electrical connection between the metal electrodes by the metal coating 56.

Figure 5:
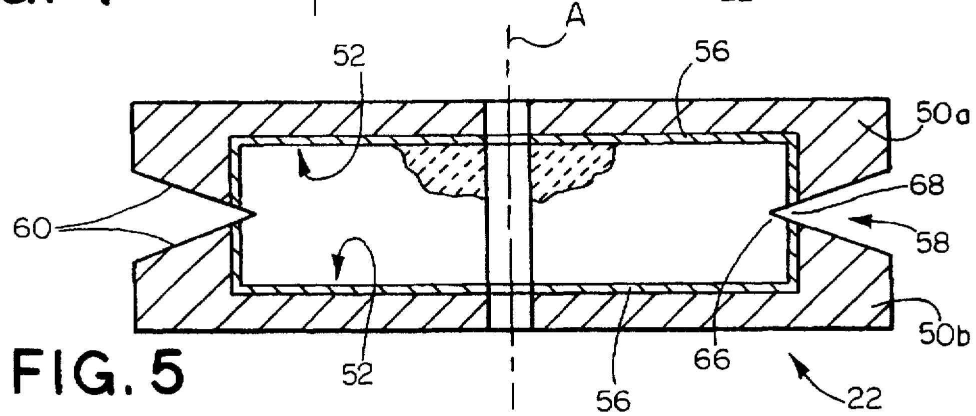
FIG. 5 is a similar section of another line-to-line embodiment of the present invention.
Figure 6:
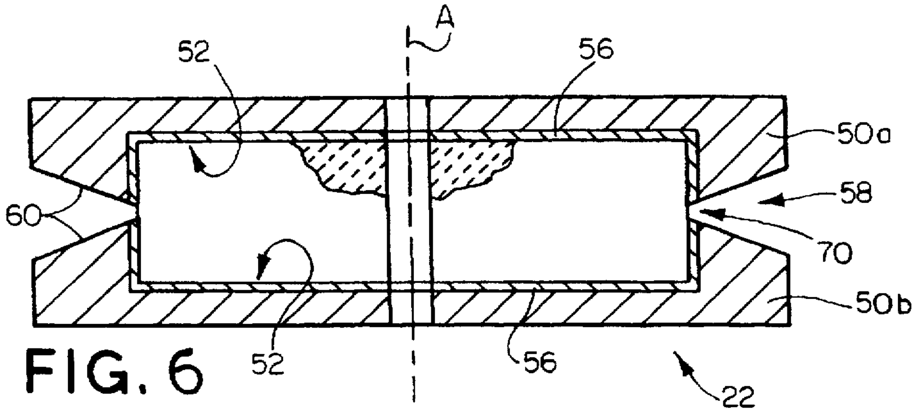
FIG. 6 is a similar section of a further embodiment.
Figure 6A:
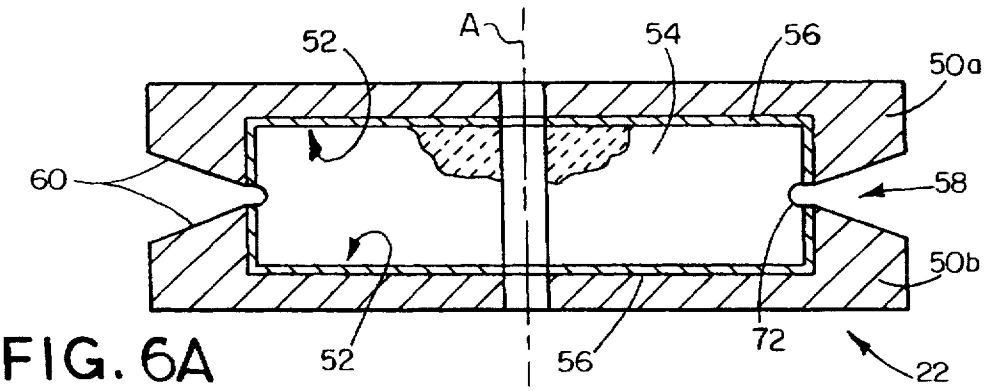
FIG. 6A is a similar section of yet another embodiment.

The groove 62 in FIG. 4 has a rectangular shape, but it will be appreciated that other shapes such as a square or U-shape may be employed. FIG. 5 shows another example of an electrode assembly 22 for use in a line-to-line surge arrester 10. The groove 66 has a V-shape which follows the taper of the rim 60 of the electrodes 50*a* and 50*b* and forms a V-shape gap 68 in the coating 56. Such design facilitates the manufacture of the electrode assembly in that a single cutting tool may be used to form the gap 58 and groove 66 as the electrode assembly 22 is rotated about its axis A. In another embodiment as seen in FIG. 6, an annular coating gap 70 is formed simply by the absence of the metal coating 56 around the circumference of the semiconductor element 54 in the area of the gap 58. A precise gap may be formed using a mask in the coating process, or removal tool thereafter. Unlike the embodiments of FIGS. 4 and 5, there is no formed notch or groove in the semiconductor element 54 in FIG. 6. In still another embodiment as shown in FIG. 6A, the grove 72 has a one-half diameter shape which is formed, for example, by a wire cut.

Figure 7:
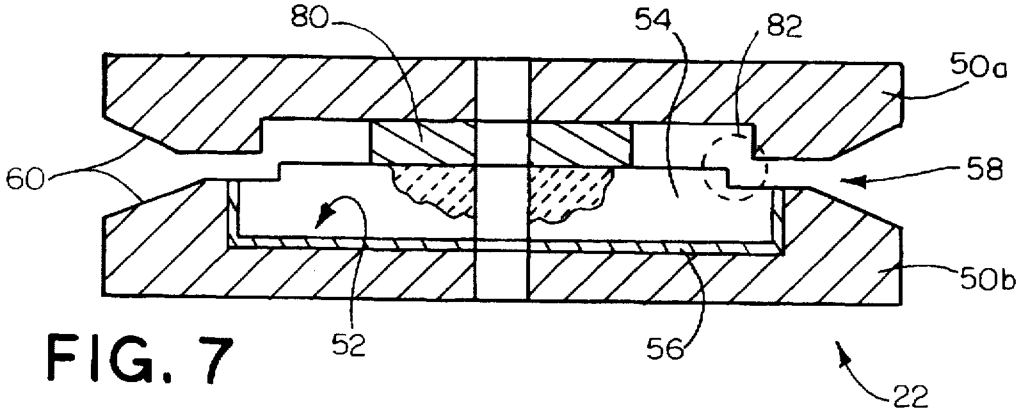
FIG. 7 is a similar section of a line-to-ground embodiment of the present invention.

The above described aspects of the invention can also be applied to an electrode assembly 22 which is to be used in a surge arrester 10 connected in a line-to-ground configuration. FIG. 7 shows such an embodiment. Because the electrode assembly 22 is to be used in a line-to-ground configuration, an insulating spacer 80 is interposed between the metal electrode 50*a* and the semiconductor element 54. Thus, there is no direct electrode-semiconductor-electrode path to ground. However, the semiconductor element 54 in this case still partially bridges the gap 58 between the metal electrodes 50*a* and 50*b* as shown in the region 82. In the exemplary embodiment, the insulating spacer 80 can be made of nylon.

In the embodiment of FIG. 7, the metal coating 56 is applied only to the outer surface of the semiconductor element 54 which is received by the cavity 52 of the metal electrode 50*b*. Since the semiconductor element 54 is not in electrical contact with the metal electrode 50*a*, there is no need for the upper surface of the semiconductor element to include the metal coating 56. The intimate metal coating, however, enables the semiconductor to function repeatedly and more responsively as a whole.

Figure 8:
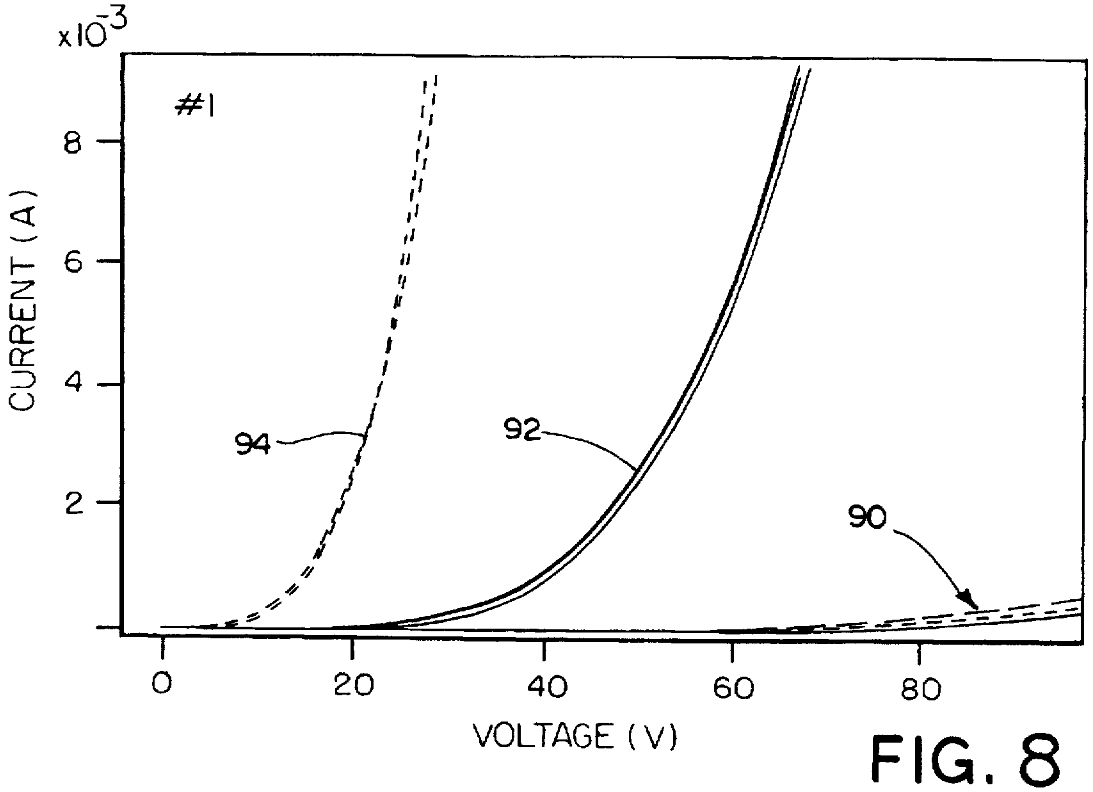
FIG. 8 is a graph showing an exemplary I–V curve of the present invention compared with a conventional device.

Turning now to FIG. 8, exemplary I–V characteristics for a surge arrester in accordance with the present invention are shown. The horizontal axis represents the voltage applied across the electrode assembly via the support brackets 14*a* and 14*b*. The vertical axis represents the resultant current which passes through the surge arrester. Curve set 90 shows the I–V characteristics of an arrester where there is no metal coating or groove 62 on the semiconductor material 54 (i.e., a conventional arrester). Curve set 92 shows the characteristics of an arrester in accordance with FIG. 6 of the present invention with a metal coating 56 applied to the outer surface of the semiconductor material 54. The gap 70 in this case is represented simply by the absence of the metal coating 56 around the circumference of the semiconductor element 54 in the area of the gap 58. It is shown that the addition of the metal coating 56 causes the I–V curve to take on a steeper, more desirable pattern. The knee of the curve is much sharper than that of the curve set 90, resulting in much more predictable firing characteristics as will be appreciated.

Curve set 94 in FIG. 8 represents the case where the semiconductor element 54 includes a rectangular or V-shaped groove 62 in addition to the metal coating 56 (e.g., FIGS. 4 and 5). As shown, the combination of the metal coating 56 and a groove formed into the surface of the semiconductor element 54 further sharpens the knee of the I–V curve. Hence, the present invention provides a way for improving the performance of surge arresters by narrowing the range at which the surge arrester will fire.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A surge arrester, comprising:

a pair of spaced metal electrodes; and a semiconductor element interposed between the metal electrodes and in contact with at least one of the metal electrodes, the semiconductor element having a peripheral edge functioning at least to partially bridge a gap between the metal electrodes with such gap serving as a current path between the metal electrodes in the event a voltage applied across the metal electrodes exceeds a firing voltage of the surge arrester, wherein the semiconductor element includes a metal coating on at least a substantial portion of its outer surface which is in contact with the at least one metal electrode, the metal coating extending generally parallel to the current path on the peripheral edge towards the gap.

2. The surge arrester of claim 1, wherein the metal coating comprises an electrically conductive metal.

3. The surge arrester of claim 1, wherein the metal coating includes at least one element selected from a group consisting of silver, chromium, platinum, palladium, copper and nickel, and alloys thereof.

4. The surge arrester of claim 1, wherein the semiconductor element metal coating is interposed between and in contact with both of the metal electrodes.

5. The surge arrester of claim 4, wherein the semiconductor element includes a gap surface which prevents a direct flow of current between the metal electrodes via the metal coating.

6. The surge arrester of claim 5, wherein the gap surface includes a notch in the semiconductor element.

7. The surge arrester of claim 6, wherein the notch is rectangular, circular or V-shape.

8. The surge arrester of claim 5, wherein the gap surface is formed by an absence of the metal coating.

9. The surge arrester of claim 4, wherein the semiconductor element comprises a ceramic disk and the metal electrodes each include a cylindrical cavity for receiving a respective portion of the ceramic disk in press fit relationship.

10. The surge arrester of claim 9, wherein the gap is formed by respective surfaces of the metal electrodes about the perimeter of the ceramic disk.

11. A surge arrester, comprising:

a pair of spaced metal electrodes; and a semiconductor element interposed between the metal electrodes and in contact with at least one of the metal electrodes, the semiconductor element functioning at least to partially bridge a gap between the metal electrodes with such gap serving as a current path between the metal electrodes in the event a voltage applied across the metal electrodes exceeds a firing voltage of the surge arrester, wherein the semiconductor element includes a metal coating on at least a substantial portion of its outer surface which is in contact with the at least one metal electrode, and wherein the semiconductor element is in contact with only one of the metal electrodes and is electrically isolated from the other metal electrode.

12. The surge arrester of claim 11, wherein the semiconductor element comprises a ceramic disk and the one metal electrode include a cylindrical cavity for receiving a portion of the ceramic disk in press fit relationship.

13. The surge arrester of claim 11, wherein the gap is formed by respective surfaces of the metal electrodes about the perimeter of the ceramic disk.

14. A surge arrester, comprising:

a pair of spaced circular metal electrodes; and a semiconductor disk in contact with and interposed between the metal electrodes, the semiconductor disk having a peripheral edge functioning to bridge a gap between the metal electrodes with such gap serving as a current path between the metal electrodes in the event a voltage applied across the metal electrodes exceeds a firing voltage of the surge arrester, and wherein the semiconductor disk includes a metal coating on at least a substantial portion of its outer surface which is in contact with at least one of the metal electrodes, the metal coating extending generally parallel to the current path on the peripheral edge towards the gap.

15. The surge arrester of claim 14 wherein said metal coating is in intimate contact with both metal electrodes.

16. The surge arrester of claim 15, wherein the circumferential surface of the semiconductor disk bridges the gap between the metal electrodes and includes the metal coating, and such peripheral edge includes a gap which prevents a direct flow of current between the metal electrodes via the metal coating.

17. The surge arrester of claim 16, wherein the gap is formed by a notch in such surface.

18. The surge arrester of claim 17, wherein the notch is circular or rectangular.

19. The surge arrester of claim 17, wherein the notch is V-shape.

20. The surge arrester of claim 19, wherein said V-shape notch is a symmetrical combination of the annular gap in the coating and the annular gap between the electrodes.

21. A surge arrester, comprising:

pair of spaced circular metal electrodes; and a semiconductor disk interposed between the metal electrodes with the semiconductor disk in contact with one of the metal electrodes and electrically isolated from the other metal electrode, the semiconductor disk functioning partially to bridge a gap between the metal electrodes with such gap serving as a current path between the metal electrodes in the event a voltage applied across the metal electrodes exceeds a firing voltage of the surge arrester, and wherein the semiconductor disk includes a metal coating on at least a substantial portion of its outer surface which is in contact with the one metal electrode.

22. The surge arrester of claim 21, further comprising an insulating spacer interposed between the semiconductor disk and the other metal electrode.

23. A method of making a surge arrester comprising the steps of fitting two electrodes on opposite sides of a semiconductor disk, providing a conductive metal coating between at least one of said electrodes and said semiconductor disk, and producing a precision annular gap in said coating on a peripheral edge of said semiconductor disk between said electrodes.

24. A method as set forth in claim 23, including the step of providing such coating in intimate and complete contact between said semiconductor disk and said one electrode.

25. A method as set forth in claim 24, including recessing said semiconductor disk in said one electrode.

26. A method as set forth in claim 23, including the step of providing such coating in intimate and complete contact between said semiconductor disk and with both said electrodes.

27. A method as set forth in claim 26, including the step of providing the semiconductor disk with a girdling notch at said gap.

28. A method as set forth in claim 27, wherein said notch is pointed and symmetrical with the gap.

29. A method as set forth in claim 28, wherein said notch, coating gap and electrodes form a symmetrical annular flared gap.

30. A method as set forth in claim 23, wherein said conductive metal coating is provided on substantially the entire peripheral edge of the semiconductor disk except for the annular gap.

* * * * *